Oct. 25, 1949.  E. S. STROBERG  2,485,936
RING WEIGHT HOLDER FOR BALANCING AUTOMOBILE WHEELS
Filed July 9, 1948  2 Sheets-Sheet 1
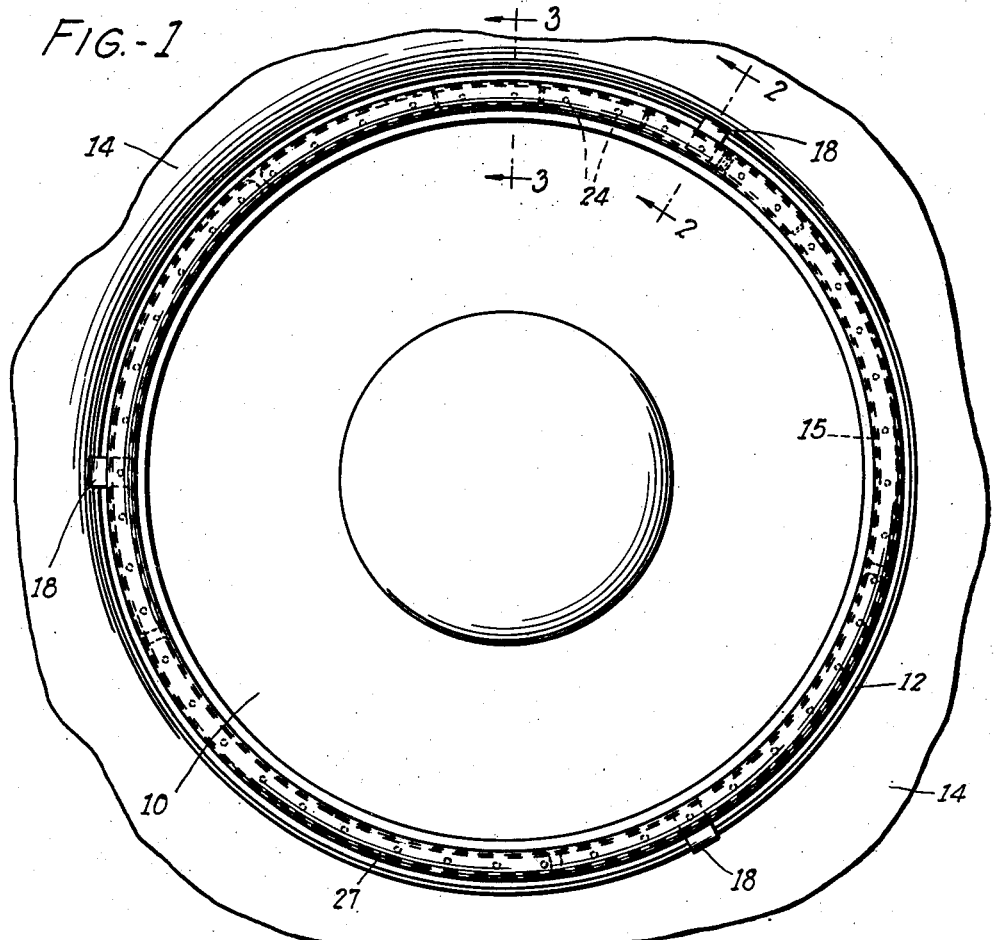
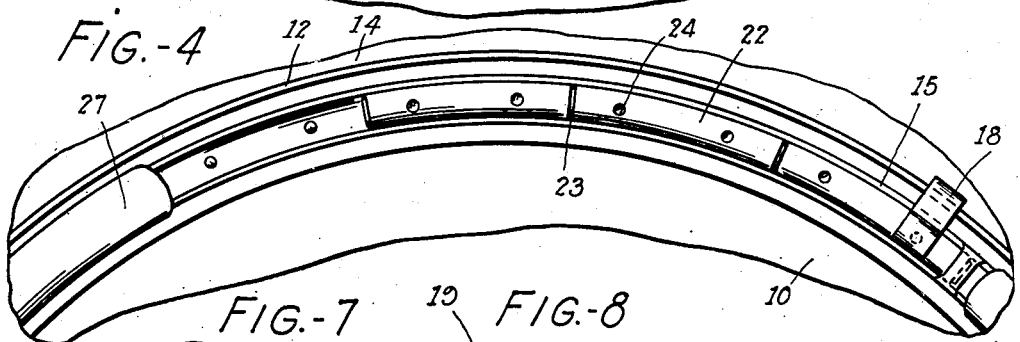
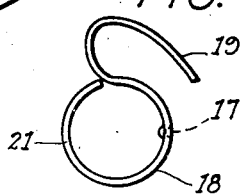
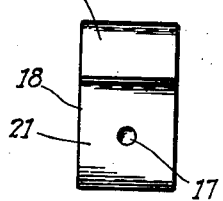
INVENTOR.
EMORY S. STROBERG
BY Victor J. Evans & Co.
ATTORNEYS Oct. 25, 1949.  E. S. STROBERG  2,485,936
RING WEIGHT HOLDER FOR BALANCING AUTOMOBILE WHEELS
Filed July 9, 1948  2 Sheets-Sheet 2
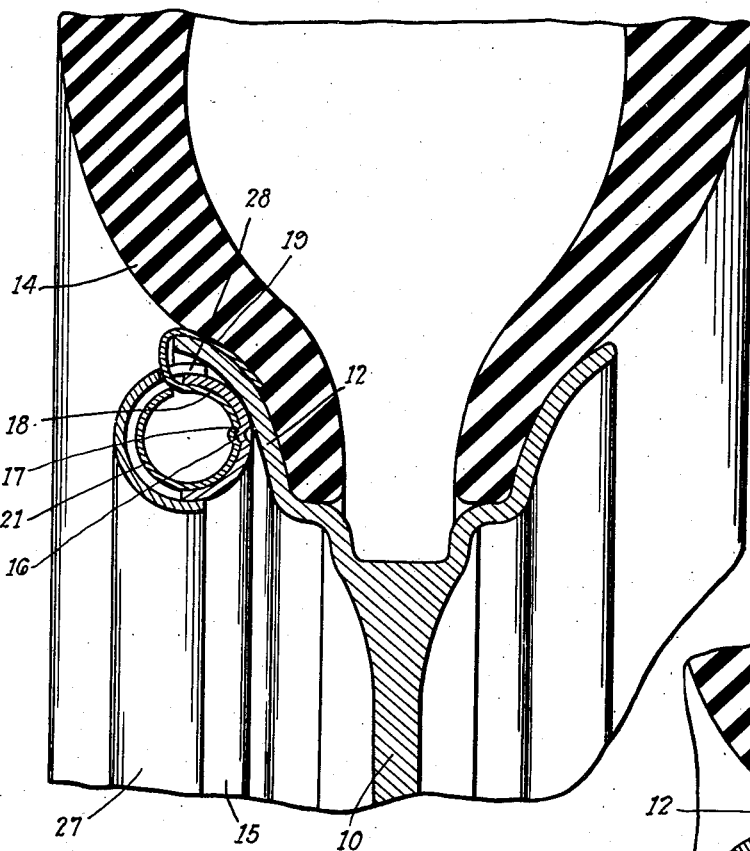
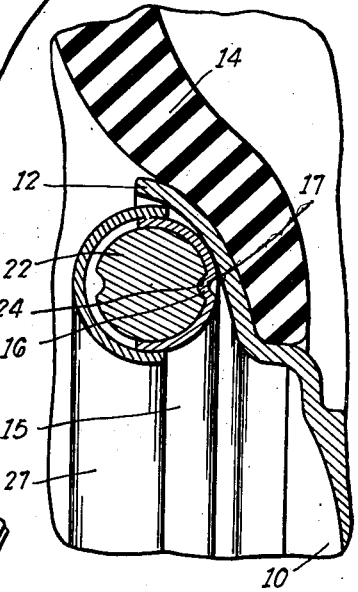
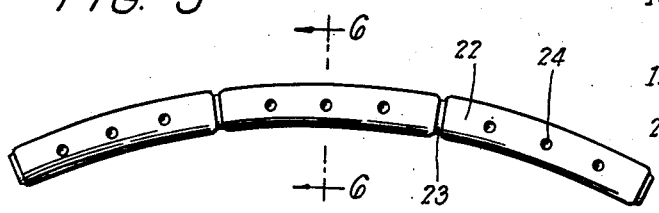
INVENTOR.
EMORY S. STROBERG
BY Victor J. Evans & Co.
ATTORNEYS Patented Oct. 25, 1949

2,485,936

UNITED STATES PATENT OFFICE 2,485,936

RING WEIGHT HOLDER FOR BALANCING AUTOMOBILE WHEELS

Emory S. Stroberg, Atlanta, Ga.

Application July 9, 1948, Serial No. 37,876

3 Claims. (Cl. 301—5)

This invention relates to a ring weight holder for balancing automobile wheels.

It is among the objects of the present invention to provide an easy means for the attachment of a balancing weight to the rim of an automobile which will be ornamental as the balancing weights will be concealed and wherein the cover may be attractively covered or plated and wherein the balancing weights will be protected and will not be destroyed so that their reuse would be prohibited.

It is another object of the invention to provide a balancing weight which does not require the attachment of soft metal to steel and wherein the balancing weights will be rigidly and safely secured to the automobile rim.

Other objects of the present invention are to provide a balancing weight arrangement for the rim of an automobile which conceals the weight, which is of simple construction, inexpensive to manufacture, easy to install upon the automobile rim, compact and efficient in operation.

For other objects and for a better understanding of the invention, reference may be had to the following detailed description taken in connection with the accompanying drawing, in which Fig. 1 is a fragmentary elevational view of a wheel employing the balancing weight attachment of the present invention.

Fig. 2 is an enlarged sectional view taken on line 2—2 of Fig. 1.

Fig. 3 is an enlarged fragmentary and sectional view taken on line 3—3 of Fig. 1 at a location removed from one of the retaining clips.

Fig. 4 is a fragmentary elevational view of a portion of the arrangement attached to the wheel.

Fig. 5 is an elevational view of the soft metal units connected together.

Fig. 6 is a sectional view taken on line 6—6 of Fig. 5.

Fig. 7 is a side elevational view of the clip.

Fig. 8 is a rear elevational view of the retaining clip.

Referring now to the figures, 10 represents a wheel having a rim flange 12 to which the balancing weights of the present invention are to be attached. Within the rim is the usual tire 14.

According to the invention, there is provided an inner ring 15 of half circular section which has inwardly pressed projection 16 spaced from one another and adapted to enter a depression 17 of a clip 18 whereby to prevent rotation of the ring 15 with respect to the clip 18. The clip 18 has an engaging portion 19 adapted to be extended downwardly over the flange 12 of the wheel and a circular portion 21 adapted to receive and retain a soft metal balancing weight 22. These weights 22 are preferably formed integral with one another with a weakened portion 23 whereby one weight can be removed from the other by breaking the same off. Each weight has a plurality of holes 24 engageable with the projected part of the clip 21 whereby to hold the weight against angular displacement relative to the clip.

If desired, a strip of weights 22 as shown in Fig. 5 can be placed in the ring 15.

Once the weights have been disposed in the ring 15, a circular cover 27 can be tightly fitted over the ring 15. The cover will have a slot 28 to receive the clip portion 19 of the clip. The clip will accordingly prevent the angular displacement of the cover 27 on the ring 15.

It will thus be apparent that the weights are concealed within the ring and cover. The cover may be colored or plated in order to have attractive appearance. The cover and ring are preferably made of steel and the clip is made of spring steel. The weight however is made of soft metal. At all times this weight will be protected and can be reused. These weights can be used in groups of more than one or can be broken apart and used separately.

While various changes may be made in the detail construction, it shall be understood that such changes shall be within the spirit and scope of the present invention as defined by the appended claims.

I claim:

1. A balancing weight arrangement for wheels comprising a ring of semi-circular section, a spring clip adapted to be fitted into the ring and extended over the rim of a wheel, balance weights of arcuate shape adapted to be fitted into the ring at different locations thereon, and a cover adapted to be extended over the clip, the weights and the ring and in tight fitting engagement with the latter.

2. A balancing weight arrangement for wheels comprising a ring of semi-circular section, a spring clip adapted to be fitted into the ring and extended over the rim of a wheel, balance weights of arcuate shape adapted to be fitted into the ring at different locations thereon, and a cover adapted to be extended over the clip, the weights and the ring and in tight fitting engagement with the latter, and said ring having an inwardly extending projection, and said spring clip having a depression for receiving the projection of the ring whereby the ring will be retained on the clip against angular displacement relative thereto.

3. A balancing weight arrangement for wheels as defined in claim 1, and said clip having an engaging portion adapted to be extended over the wheel rim and a circular portion adapted to fit the ring, and said cover having a slot for receiving the clip whereby to prevent the angular displacement of the cover relative to the clip and relative to the ring.

EMORY S. STROBERG.

No references cited.